United States Patent
Koyama et al.

(10) Patent No.: US 10,151,010 B2
(45) Date of Patent: Dec. 11, 2018

(54) SOFT NITRIDED INDUCTION HARDENED STEEL PART

(71) Applicant: Nippon Steel & Sumitomo Metal Corporation, Tokyo (JP)

(72) Inventors: Tatsuya Koyama, Tokyo (JP); Suguru Yoshida, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 401 days.

(21) Appl. No.: 14/894,506

(22) PCT Filed: May 30, 2013

(86) PCT No.: PCT/JP2013/065063
§ 371 (c)(1),
(2) Date: Nov. 28, 2015

(87) PCT Pub. No.: WO2014/192117
PCT Pub. Date: Dec. 4, 2014

(65) Prior Publication Data
US 2016/0122841 A1    May 5, 2016

(51) Int. Cl.
| | | |
|---|---|---|
| C21D 9/00 | (2006.01) | |
| C22C 38/60 | (2006.01) | |
| C22C 38/50 | (2006.01) | |
| C22C 38/46 | (2006.01) | |
| C22C 38/40 | (2006.01) | |
| C22C 38/32 | (2006.01) | |
| C22C 38/30 | (2006.01) | |
| C22C 38/28 | (2006.01) | |
| C22C 38/26 | (2006.01) | |
| C22C 38/24 | (2006.01) | |
| C22C 38/22 | (2006.01) | |
| C22C 38/20 | (2006.01) | |
| C22C 38/06 | (2006.01) | |
| C22C 38/04 | (2006.01) | |
| C22C 38/02 | (2006.01) | |
| C22C 38/00 | (2006.01) | |
| C23C 8/26 | (2006.01) | |
| C21D 1/42 | (2006.01) | |
| C21D 1/18 | (2006.01) | |
| C21D 6/00 | (2006.01) | |

(52) U.S. Cl.
CPC ............. *C21D 9/0068* (2013.01); *C21D 1/18* (2013.01); *C21D 1/42* (2013.01); *C21D 6/004* (2013.01); *C21D 6/005* (2013.01); *C21D 6/007* (2013.01); *C21D 6/008* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/40* (2013.01); *C22C 38/46* (2013.01); *C22C 38/50* (2013.01); *C22C 38/60* (2013.01); *C23C 8/26* (2013.01); *Y02P 10/253* (2015.11)

(58) Field of Classification Search
CPC .................................................. C21D 9/0068
See application file for complete search history.

(56) References Cited

U.S. PATENT DOCUMENTS

| | | | | |
|---|---|---|---|---|
| 8,802,005 | B2 * | 8/2014 | Mizuno | ..................... C23C 8/26 420/103 |
| 2008/0247900 | A1 | 10/2008 | Hayashi et al. | |
| 2011/0041959 | A1 | 2/2011 | Mizuno | |
| 2011/0274578 | A1 * | 11/2011 | Mizuno | ..................... C23C 8/26 420/84 |
| 2013/0180626 | A1 | 7/2013 | Yoshida | |

FOREIGN PATENT DOCUMENTS

| | | |
|---|---|---|
| CN | 1950530 A | 4/2007 |
| CN | 102851601 A | 1/2013 |
| JP | 6-172961 | 6/1994 |
| JP | 0790364 | 4/1995 |
| JP | 2007-77411 | 3/2007 |
| JP | 2011-208250 | 10/2011 |
| WO | WO2010/070958 | 6/2010 |
| WO | WO2010/082685 | 7/2010 |
| WO | WO2012/056785 | 5/2012 |

OTHER PUBLICATIONS

International Search Report dated Aug. 27, 2013 issued in corresponding PCT Application No. PCT/JP2013/065063.

* cited by examiner

*Primary Examiner* — Jessee R Roe
*Assistant Examiner* — Jophy S. Koshy
(74) *Attorney, Agent, or Firm* — Birch, Stewart, Kolasch & Birch, LLP (57) ABSTRACT

A soft nitrided induction hardened steel part which is excellent in bearing fatigue strength comprised of a predetermined chemical composition wherein a dissolved N concentration from the surface to 0.2 mm depth is 0.05 to 1.50%, a Vicker's hardness from the surface to 0.2 mm depth after tempering at 300° C. is HV 600 or more, and t/r≤0.35 when an effective hardened layer depth "t" is 0.5 mm or more and a radius of a breakage risk site or half of the thickness is "r" (mm).

2 Claims, 1 Drawing Sheet

SOFT NITRIDED INDUCTION HARDENED STEEL PART

TECHNICAL FIELD

The present invention relates to a soft nitrided induction hardened steel part, more particularly relates to a soft nitrided induction hardened steel part which is used for a gear, continuously variable transmission, constant velocity joint, hub, etc. which has a high bearing fatigue strength as applied to a power transmission part of an automobile etc.

BACKGROUND ART

For example, the gear of an automatic transmission or sheave of a continuously variable transmission, constant velocity joint, hub, or other power transmission part or other steel part is required to have a high bearing fatigue strength. In general, as the material for the above parts, JIS SCr420, SCM420, or other C: 0.2% or so case hardened steel is used. The case hardened steel is used treated by carburized quenching to form a C: 0.8% or so martensite structure hardened layer at the surface layer of the part so as to raise the bearing fatigue strength.

However, carburized quenching treatment is treatment at a 950° C. or so high temperature austenite region for 5 to 10 hours, in some cases 10 hours or more, so the crystal grains sometimes coarsen causing heat treatment deformation (quenching strain) to increase. For this reason, when a high precision is required, after the carburized quenching, the part has to be ground, honed, or otherwise finished.

In recent years, demand for making automobile engines etc. lower in noise has been rising, so surface hardening treatment such as induction hardening or soft nitridation with smaller thermal strain compared with carburized quenching treatment has come under the spotlight.

Induction hardening quenches only the required part of a surface layer part by a short period of heating to convert it to austenite, so the quenching strain is small. According to induction hardening, it is possible to obtain a surface hardened part with good precision. However, if using only induction hardening to obtain a strength equal to that of a carburized quenched material, a steel material which has a content of C of over 0.8% would be required. As a result, the base material would rise in hardness and the machineability would be remarkably degraded. Therefore, it is not possible to increase the content of C in the steel willy-nilly. There is a limit to improving the bearing fatigue strength by just induction hardening.

Soft nitridation treatment is treatment which obtains a surface hardened layer at a temperature range of the $A_1$ transformation point or less. Further, compared with carburized quenching treatment, the treatment time is a short 2 to 4 hours or so. For this reason, soft nitridation is often applied to steel parts from which low strain is demanded. However, the hardened layer depth which is obtained by soft nitridation treatment alone is small, so it is difficult to apply this to transmission gears etc. where a high bearing pressure is applied.

Recently, as a technique which makes up for the defects of induction hardening and soft nitridation treatment and obtained better mechanical properties, in particular bearing fatigue strength, it has been attempted to perform soft nitridation followed by induction hardening.

PLTs 1 to 3 disclose steel for machine structural use where soft nitridation treatment and induction hardening are combined to improve the bearing fatigue strength. In the art which is described in PLTs 1 to 3, the induction hardening temperature is less than 950° C., so the nitrides which precipitated at the surface layer due to the soft nitridation treatment did not sufficiently dissolve. Most of the nitrogen (N) remained present as nitrides. The dissolved N concentration of the surface layer was low. As a result, the compressive residual stress was low, so a sufficiently high bearing fatigue strength could not be obtained.

PLT 4 proposes a process of production of a steel part which is excellent in mechanical strength by a combination of induction hardening and nitridation treatment. The steel part which is obtained by the process of production of PLT 4 had a high surface layer hardness. However, the total N concentration at the surface layer, that is, the total of the N concentration of nitrides and the dissolved N concentration, was low, and V and other nitride-forming elements were present in large amounts. Further, the dissolved N concentration in the total N concentration of the surface layer was low, so the high temperature hardness of the surface layer was low. For this reason, it was not possible to obtain a sufficient temper softening resistance at the surface layer of a gear etc. becoming high in temperature during operation and not possible to obtain a high bearing fatigue strength.

PLT 5 also proposes art which combines induction hardening and nitridation treatment so as to obtain excellent mechanical properties. The art which is described in PLT 5 is characterized by a high concentration of nitrogen from the surface to 0.05 mm depth. However, bearing fatigue fracture is fracture starting from the surface, but the depth of fracture reaches several times the depth of 0.05 mm. Therefore, with just a high hardness from the surface to a depth of 0.05 mm, a high bearing fatigue strength cannot be obtained.

PLT 6 also proposes a process of production of a steel part which is excellent in mechanical strength by a combination of induction hardening and nitridation treatment. The art which is described in PLT 6 gives a deeper effective hardened layer for the size of the part and a deeper depth occupied in the region of austenization by high frequency heating. For this reason, the compressive residual stress in the vicinity of the surface is small and furthermore the quenching strain becomes large. This is not preferable as part characteristics.

Citations List

Patent Literature

PLT 1: WO2010/082685A
PLT 2: Japanese Patent Publication No. 2011-208250A
PLT 3: WO2010/070958A
PLT 4: Japanese Patent Publication No. 6-172961A
PLT 5: Japanese Patent Publication No. 2007-77411A
PLT 6: Japanese Patent Publication No. 7-90364A

SUMMARY OF INVENTION

Technical Problem

The present invention, in consideration of the above actual situation, has as its object the provision of a soft nitrided induction hardened steel part which is excellent in temper softening resistance, which exhibits a high compressive residual stress in the vicinity of the surface, and which is excellent in bearing fatigue strength—which cannot be obtained with conventional soft nitrided induction hardened steel parts.

Solution to Problem

Power transmission parts rise in temperature at their operating surfaces to 300° C. or so due to the heat generated during use. Therefore, for improvement of the bearing fatigue strength of steel parts, it is effective to improve the temper softening resistance so as to maintain the high temperature strength of the operating surfaces. Furthermore, to improve the bearing fatigue strength of steel parts, it is effective to raise the compressive residual stress in the vicinity of the surface. Further, for improvement of the precision of steel parts, reduction of the quenching strain is effective. The inventors engaged in various studies on surface hardening treatment of steel parts by combining soft nitridation treatment and induction hardening and obtained the following discoveries.

a) To improve the temper softening resistance of the operating surface of a steel part, it is effective to raise the dissolved N concentration of the surface layer of the steel part. The N concentration which is usually measured is the total of the N which is dissolved in the martensite and the N of nitrides in the steel. The inventors etc. changed the maximum temperature at the time of high frequency heating to change the ratio of dissolved N and nitrides at the surface layer so as to investigate the effect which the dissolved N concentration of the surface layer at the time of tempering at 300° C. has on the hardness and as a result confirmed that making the dissolved N concentration in the martensite increase is effective for improving the temper softening resistance.

b) To raise the compressive residual stress in the vicinity of the surface, it is effective to raise the dissolved N concentration of the surface layer and make the effective hardened layer depth relatively shallow. That is, if raising the dissolved N concentration of the surface layer, the amount of expansion due to the martensite transformation at the time of induction hardening becomes greater, so the compressive residual stress in the vicinity of the surface can be made higher. Further, making the effective hardened layer depth shallower for the size of the part also enables the compressive residual stress in the vicinity of the surface to be made higher. By combining these, it is possible to raise the compressive residual stress in the vicinity of the surface. Furthermore, making the effective hardened layer depth shallower for the size of the part also contributes to reduction of the quenching strain. This is because quenching strain appears due to the martensite transformation of austenite.

To raise the dissolved N concentration of the surface layer, the peak temperature at the time of high frequency heating has to be raised. However, if simply raising the peak temperature at the time of high frequency heating, the effective hardened layer depth becomes too deep and the compressive residual stress in the vicinity of the surface becomes low. In the prior art as well, there are examples of 900° C. or more high frequency heating being performed, but the effective hardened layer depth became deep and the compressive residual stress could not be sufficiently raised.

The inventors engaged in in-depth studies of the conditions of high frequency heating for solving the above problem and thereby completed the present invention. The gist of the invention is as follows:

(1) A soft nitrided induction hardened steel part excellent in bearing fatigue strength comprising a base material with a chemical composition comprising, by mass %, C: 0.30 to 0.80%, Si: 0.02 to 2.5%, Mn: 0.35 to 2.0%, Al: 0.001 to 2.0%, Cr: 0.01 to 3.0%, S: 0.040% or less, and N: 0.0030 to 0.02%, limiting O: 0.005% or less and P: 0.025% or less, and having a balance of Fe and impurities, wherein a concentration of dissolved N from the surface to 0.2 mm depth is 0.05 to 1.50%, a Vicker's hardness from the surface to 0.2 mm depth after tempering at 300° C. is HV 600 or more, and t/r≤0.35 when an effective hardened layer depth "t" is 0.5 mm or more and a radius of a breakage risk site or half of the thickness is "r" (mm).

(2) The soft nitrided induction hardened steel part according to (1), comprising, instead of part of the Fe of the chemical composition of the base material, by mass %, one or more of Nb: 0.3% or less, Ti: 0.3% or less, V: 1.0% or less, Ni: 3.0% or less, Cu: 3.0% or less, Co: 3.0% or less, Mo: 1.0% or less, W: 0.5% or less, B: 0.005% or less, Ca: 0.01% or less, Mg: 0.01% or less, Zr: 0.05% or less, Te: 0.1% or less, Pb: 0.5% or less, and REM: 0.005% or less.

Advantageous Effects of Invention

According to the present invention, it is possible to provide a gear, continuously variable transmission, constant velocity joint, hub, or other power transmission part which exhibits a high compressive residual stress in the vicinity of the surface and which is excellent in bearing fatigue strength—which cannot be obtained with conventional soft nitrided induction hardened steel parts.

DESCRIPTION OF EMBODIMENTS

The inventors etc. investigated the effects on the temper softening resistance of the surface layer and the compressive residual stress in the vicinity of the surface and as a result learned that by raising the dissolved N concentration of the surface layer and controlling the effective hardened layer depth to become shallower, the bearing fatigue strength becomes excellent.

First, the reasons for definition of the chemical composition of the base material of the present invention will be explained. Here, the "%" in the chemical composition expresses "mass %".

C: 0.30 to 0.80%

C is an element which is important for obtaining the strength of the steel. In particular, it is necessary for reducing the ferrite fraction of the structure before induction hardening and for quickly making the surface layer of the steel an austenite single phase in the case of high frequency heating so as to improve the hardenability at the time of induction hardening. If the content of C is less than 0.30%, the ferrite fraction will be high and induction hardening will not be enough for causing sufficient hardening. If the content of C is over 0.80%, the machineability and forgeability at the time of fabrication of the steel part will be remarkably impaired and, furthermore, the possibility of occurrence of quenching cracks at the time of induction hardening will become greater. Therefore, the content of C was made 0.30 to 0.80%. The content of C is preferably 0.40 to 0.60%.

Si: 0.02 to 2.5%

Si has the effect of improving the temper softening resistance of the surface layer and thereby improving the bearing fatigue strength. To obtain this effect, the content of Si has to be made 0.02% or more. If the content of Si is over 2.5%, the decarburization at the time of forging becomes remarkable. Therefore, the content of Si was made 0.02 to 2.5%. The content of Si is preferably 0.20 to 0.80%.

Mn: 0.35 to 2.0%

Mn is an element which improves the hardenability and raises the temper softening resistance of the surface layer so as to improve the bearing fatigue strength. Further, it is effective for reducing the ferrite fraction of the structure before induction hardening and improving the hardenability at the time of induction hardening. To obtain this effect, the content of Mn has to be made 0.35% or more. If the content of Mn is over 2.0%, the steel material becomes too hard at the time of manufacture which obstructs cutting of the steel bars. Furthermore, Mn easily segregates between the dendrites at the solidification stage at the time of steelmaking causing local hardening and sometimes making the steel material brittle. Therefore, the content of Mn was made 0.35 to 2.0%. The content of Mn is preferably 0.50 to 1.5%.

Al: 0.001 to 2.0%

Al is an element which forms nitrides at the time of soft nitridation, makes the total N concentration of the surface layer increase, and makes the dissolved N concentration of the surface layer increase due to part or all of the nitrides dissolving at the time of induction hardening. Further, even if undissolved nitrides are present at the time of induction hardening, they disperse in the steel, so have the effect of effectively working to refine the austenite structure at the time of induction hardening treatment. Further, it is an element which is also effective for improving the machineability. For this reason, the content of Al has to be made 0.001% or more. If the content of Al is over 2.0%, the precipitates coarsen and make the steel brittle. Therefore, the content of Al was made 0.001 to 2.0%. The content of Al is preferably 0.020 to 0.10%.

Cr: 0.01 to 3.0%

Cr is an element which has an effect similar to Al. That is, Cr is an element which forms nitrides at the time of soft nitridation, makes the total N concentration of the surface layer increase, and makes the dissolved N concentration of the surface layer increase by part or all of the nitrides dissolving at the time of induction hardening. Further, even if nitrides are present which do not dissolve at the time of induction hardening, they disperse in the steel, so have the effect of effectively acting to refine the austenite structure at the time of induction hardening treatment. To obtain this effect, the content of Cr has to be made 0.01% or more. If the content of Cr exceeds 3.0%, the machineability deteriorates. Therefore, the Cr content was made 0.01 to 3.0%. The Cr content is preferably 0.05% to less than 1.0%.

S: 0.040% or less

S is an impurity element. Further, if deliberately included, it is an element which is effective for improvement of the machineability. If the content of S is over 0.040%, the forgeability remarkably declines. Therefore, the content of S was made 0.040% or less. The content of S is preferably 0.001 to 0.015%.

N: 0.003 to 0.02%

N forms various nitrides and works effectively to prevent coarsening of the austenite structure of the core part. To obtain this effect, the content of N has to be made 0.003% or more. If the content of N is over 0.02%, the Al, Cr, and other alloy elements which originally have the actions of making the total N concentration increase at the time of soft nitridation form coarse nitrides at the time of solidification. The coarse nitrides do not dissolve at the time of induction hardening, so the actual dissolved N concentration after induction hardening becomes lower. Therefore, the content of N was made 0.003 to 0.02%. The content of N is preferably 0.004 to less than 0.012%.

O (oxygen) and P are impurities, but have to be particularly restricted in the present invention.

O: 0.005% or less

O is present in the steel as $Al_2O_3$, $SiO_2$, and other oxide-based inclusions, but if O is large in amount, the oxides become large in size. These become starting points for fracture of the power transmission parts. For this reason, the content of O has to be restricted to 0.005% or less. The smaller the content of O, the better, so 0.002% or less is preferable. Furthermore, if aiming at longer lifetime, 0.0015% or less is preferable.

P: 0.025% or less

P segregates at the grain boundaries to cause the toughness to fall, so has to be reduced as much as possible. It is restricted to 0.025% or less.

The balance of the base material is Fe and impurities. The "impurities" mean elements which enter from the raw materials of the steel and the manufacturing environment.

Next, the reasons for definition of the chemical ingredients which can be optionally included will be explained.

Steel Material-Reinforcing Elements

Nb: 0.3% or less

Nb is an element which has an effect similar to Al. That is, Nb is an element which forms nitrides at the time of soft nitridation, makes the total N concentration of the surface layer increase, and makes the dissolved N concentration of the surface layer increase by part or all of the nitrides dissolving at the time of induction hardening. Further, even if nitrides are present which do not dissolve at the time of induction hardening, they disperse in the steel, so have the effect of effectively acting to refine the austenite structure at the time of induction hardening treatment. Further, this is an element which is effective for improving the machineability. However, even if over 0.3% is included, the effect becomes saturated and the economicalness is impaired. Therefore, the content of Nb when including it was made 3.0% or less. To stably obtain the above effect, the content of Nb is preferably made 0.005% or more.

Ti: 0.3% or less

Ti is an element which has an effect similar to Al. That is, Ti is an element which forms nitrides at the time of soft nitridation, makes the total N concentration of the surface layer increase, and makes the dissolved N concentration of the surface layer increase by part or all of the nitrides dissolving at the time of induction hardening. Further, even if nitrides are present which do not dissolve at the time of induction hardening, they disperse in the steel, so have the effect of effectively acting to refine the austenite structure at the time of induction hardening treatment. However, if the content of Ti is over 0.3%, the precipitate coarsens and the steel is made brittle. Therefore, the content of Ti when including it was made 3.0% or less. To stably obtain the above effect, the content of Ti is preferably made 0.005% or more.

V: 1.0% or less

V is an element which has an effect similar to Al. That is, V is an element which forms nitrides at the time of soft nitridation, makes the total N concentration of the surface layer increase, and makes the dissolved N concentration of the surface layer increase by part or all of the nitrides dissolving at the time of induction hardening. Further, even if nitrides are present which do not dissolve at the time of induction hardening, they disperse in the steel, so have the effect of effectively acting to refine the austenite structure at the time of induction hardening treatment. However, even if over 1.0% is included, the effect becomes saturated and the economicalness is impaired. Therefore, the content of V when including it was made 1.0% or less. To stably obtain the above effect, the content of V is preferably made 0.01% or more.

W: 0.5% or less

W is an element which has an effect similar to Al. That is, W is an element which forms nitrides at the time of soft nitridation, makes the total N concentration of the surface layer increase, and makes the dissolved N concentration of the surface layer increase by part or all of the nitrides dissolving at the time of induction hardening. Further, even if nitrides are present which do not dissolve at the time of induction hardening, they disperse in the steel, so have the effect of effectively acting to refine the austenite structure at the time of induction hardening treatment. Further, W lowers the ferrite fraction of the structure before induction hardening and improves the hardenability at the time of induction hardening. If the content of W is over 0.5%, the machineability deteriorates. Furthermore, the effect becomes saturated and the economicalness is impaired. Therefore, the content of W when including it was made 0.5% or less. To stably obtain the above effect, the content of W is preferably made 0.03% or more.

Hardenability-Improving Elements

Ni: 3.0% or less

Ni raises the hardenability and further improves the toughness. If the content of Ni exceeds 3.0%, the machineability deteriorates. Therefore, the content of Ni when including it was made 3.0% or less. To stably obtain the above effect, the content of Ni is preferably made 0.01% or more.

Cu: 3.0% or less

Cu reinforces the ferrite and is also effective for improving the hardenability and improving the corrosion resistance. Even if over 3.0% is included, the effect becomes saturated in terms of the mechanical properties. Therefore, the content of Cu when including it was made 3.0% or less. To stably obtain the above effect, the content of Cu is preferably made 0.01% or more. Cu causes a drop in the hot ductility and easily becomes a cause of defects at the time of rolling, so inclusion simultaneously with Ni is preferable.

Co: 3.0% or less

Co contributes to improvement of the hardenability. Even if over 3.0%, the effect becomes saturated. Therefore, the content of Co when including it was made 3.0% or less. To stably obtain the above effect, the content of Co is preferably made 0.01% or more.

Mo: 1.0% or less

Mo improves the temper softening resistance of the surface layer, so in addition to the effect of improving the bearing fatigue strength, also has the effect of making the hardened layer stronger and tougher and improving the bending fatigue strength. Even if over 1.0% is included, the effect becomes saturated and the economicalness is impaired. Therefore, the content of Mb when including it was made 1.0% or less. To stably obtain the above effect, the content of Mo is preferably made 0.01% or more.

B: 0.005% or less

B contributes to improvement of the hardenability. Even if over 0.005%, its effect becomes saturated. Therefore, the content of B when including it was made 0.005% or less. To stably obtain the above effect, the content of B is preferably made 0.0006% or more.

Machineability-Improving Elements

When machineability is also sought when fabricating the parts, one or more elements which are selected from Ca, Mg, Zr, Te, Pb, and a REM are included.

Ca: 0.01% or less, Mg: 0.01% or less, Zr: 0.05% or less, Te: 0.1% or less, Pb: 0.5% or less, and REM: 0.005% or less These elements suppress the flattening of MnS and are present in the form of brittle phases so improve the machineability. To give these effects, at least one element which is selected from Ca: 0.01% or less, Mg: 0.01% or less, Zr: 0.05% or less, Te: 0.1% or less, Pb: 0.5% or less, and REM: 0.005% or less is included. A "REM" is a rare earth metal. Even if an element is included in over the upper limit value, its effect becomes saturated and the economicalness is impaired. Therefore, the contents of Ca, Mg, Zr, Te, Pb, and REM when including them were made respectively 0.01% or less, 0.01% or less, 0.05% or less, 0.1% or less, 0.5% or less, and 0.005% or less. To stably obtain the above effect, the contents of Ca, Mg, Zr, Te, Pb, and REM when including them are preferably made 0.0005% or more.

Next, the dissolved N concentration from the surface down to a 0.2 mm depth and the Vicker's hardness from the surface down to a 0.2 mm depth after tempering at 300° C. will be explained. Below, the dissolved N concentration from the surface down to a 0.2 mm depth will be referred to as the "dissolved N concentration of the surface layer". Further, the Vicker's hardness from the surface down to a 0.2 mm depth after tempering at 300° C. will be referred to as the "tempered hardness of the surface layer at 300° C.".

The "dissolved N concentration of the surface layer" is the value of the total amount of N in the steel minus the amounts of N which are contained in the AlN, NbN, TiN, VN, and other nitrides. The amount of dissolved N of the surface layer is obtained by using the inert gas melting-heat conductivity method to measure the total N amount, using the SPEED method of the constant potential electrolytic corrosion method using a nonaqueous solvent electrolyte and a 0.1 μm filter to electrolytically extract the residue, and using the indophenol light absorption method to measure the amount of N in the nitride then using the following formula (2) for calculation:

$$\text{(Amount of dissolved } N\text{)}=\text{(Total amount of } N\text{)}-\text{(Amount of } N \text{ in nitrides)} \quad (2)$$

To measure the region from the surface down to 0.2 mm depth, as the measurement sample, a cutting scrap when cutting down to 0.2 mm is used. However, to keep down the effect of a temperature rise due to the heat generated at the time of cutting, it is necessary that the cutting scrap not exhibit a temper color.

The inventors changed the soft nitridation conditions, induction hardening conditions, and chemical composition of the steel material, changed the dissolved N concentration of the surface layer after induction hardening, and investigated the tempered hardness of the surface layer at 300° C. after tempering at 300° C. for 60 minutes. As a result, it was confirmed that with a dissolved N concentration of the surface layer of 0.05% to 1.5% in range, the higher the dissolved N concentration of the surface layer, the more the tempered hardness of the surface layer at 300° C. is improved.

The N which is dissolved in the martensite, in the same way as C, is present in the crystals as substituted type dissolved atoms, so contributes to solution strengthening and dislocation strengthening and improves the strength. If tempering at 300° C., the dissolved C precipitates as carbides and the dissolved C concentration in the martensite falls so the strength of the steel falls. On the other hand, N maintains a dissolved state, so even if the steel is tempered at 300° C., the steel will maintain a high strength. For this reason, compared with a part which is treated by only carburized quenching or only induction hardening, a part which is treated by soft nitridation and induction hardening has a higher 300° C. tempered hardness.

If the dissolved N concentration of the surface layer is less than 0.05%, the improvement in the tempered hardness of the surface layer at 300° C. is small and the bearing fatigue strength is low. To obtain a sufficiently high tempered hardness of the surface layer at 300° C., 0.10% or more is preferable. If the dissolved N concentration of the surface layer is over 1.5%, the martensite transformation start temperature at the time of cooling falls and the residual austenite after induction hardening becomes higher. As a result, due to the increase in the dissolved N concentration of the surface layer, the hardness falls more than the hardness of the surface layer after quenching and the tempered hardness of the surface layer at 300° C. are improved. For this reason, conversely the bearing fatigue strength falls.

The 300° C. tempered hardness of the surface layer is made 600 or more because if the depth at which the tempered hardness of the surface layer at 300° C. becomes 600 or more is shallower than 0.2 mm from the surface, the steel part cannot withstand the bearing pressure which is applied and cracks under fatigue.

Next, the effective hardened layer depth will be explained.

The effective hardened layer depth "t" is prescribed by the JIS G0559. In a steel part of the present invention, the effective hardened layer depth "t" is 0.5 mm or more and the following formula [1] is satisfied.

$$t/r \leq 0.35 \quad [1]$$

where t: effective hardened layer depth (mm), r: radius of breakage risk site or half of thickness (mm)

Figure 1:
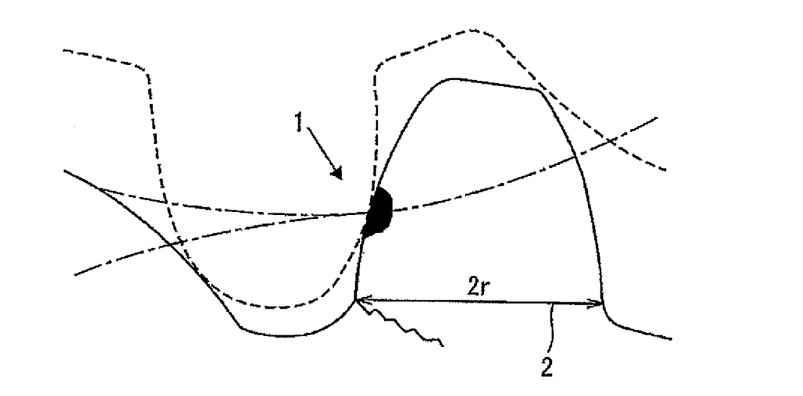
FIG. 1 is a schematic view which explains a breakage risk site.

The "r" of the radius of the breakage risk site or half of the thickness is an indicator which is used for comparing the effective hardened layer depth and size of a part. A "breakage risk site" is a risk cross-section in design. In a columnar like part such as a shaft, "r" is the radius of the minimum diameter part or the cross-sectional part where the stress concentration becomes the maximum (case where cross-section is circular) or half of the thickness (case where cross-section is rectangular). In a gear part, the part which is shown by the arrow in FIG. 1 is the breakage risk site (fatigue fracture site) 1, while 2r is the thickness 2.

By making the ratio of the region which transforms to austenite at the time of high frequency heating, that is, the ratio of the effective hardened layer depth to the size of the part, smaller, it is possible to make the compressive residual stress in the vicinity of the surface increase and to reduce the quenching strain.

If the effective hardened layer becomes deeper, not only does the compressive residual stress in the vicinity of the surface fall, but also quenching cracks are caused, so the upper limit of formula [1] is made 0.35. For example, in a large roller test piece which is used in a roller pitting fatigue test, when making the effective hardened layer depth 40 mm for a radius 65 mm, quenching cracks are caused at the surface at the time of induction hardening. To make the compressive residual stress in the vicinity of the surface higher, 0.3 or less is preferable.

The reason for setting the lower limit of formula [1] is not dependent on the size of the part. Accordingly, the lower limit is not made the lower limit of formula [1], but is set by making the effective hardened layer depth 0.5 mm or more. If the effective hardened layer depth becomes shallower, a high shear stress is generated at the core part as well, a fissure is formed between the hardened layer and the core part, and the fissure grows causing spalling. The effective hardened layer depth, viewed from safety, is preferably made 0.75 mm or more.

The soft nitridation treatment temperature is made 500° C. or more, since the lower the temperature, the longer the treatment time. On the other hand, if the soft nitridation treatment temperature exceeds the $A_1$ point, the heat treatment strain will become greater, so the temperature is made less than the $A_1$ point of the steel material.

The cooling after the soft nitridation treatment may be performed by any method of natural cooling, air-cooling, gas cooling, oil cooling, etc.

As the soft nitridation treatment, a method of N penetration in any surroundings of a gas atmosphere, salt bath, or electrical field may be applied. Note that not only soft nitridation treatment, but also nitridation treatment (treatment causing penetration of N without accompanying penetration of C), and oxynitridation treatment (nitridation treatment+oxidation treatment) may also be applied.

The heating method when applying induction hardening has to be determined while considering the dissolved N concentration of the surface layer. The high frequency heating temperature where a dissolved N concentration of the surface layer of 0.05 to 1.5% can be realized is 950° C. or more. The higher the high frequency heating temperature, the more the dissolved N concentration of the surface layer increases, but if the temperature is made too high, the crystal grains will coarsen and strain will cause the parts precision to fall, so the high frequency heating temperature is made 1200° C. or less. The more preferable high frequency heating temperature is 950 to 1050° C., more preferably 960 to 980° C.

If the frequency of the high frequency heating is too low, thee targeted heating temperature and the hardened layer depth and effective hardened layer depth cannot both be achieved. If the frequency is too high, realization industrially becomes difficult due to the hardware performance. The frequency of the high frequency heating is made 100 to 300 kHz.

The effective hardened layer depth depends on the size of the part. If the effective hardened layer depth is 0.5 mm or more and is suitably adjusted to satisfy formula [1], mainly the heating time is adjusted. For example, in the case of a radius 13 mm of a small roller which is used for a roller pitting fatigue test, if the frequency is made 200 kHz and the high frequency heating temperature is made 950° C., when the heating time is 25 seconds, the effective hardened layer depth will exceed 4.55 mm. This is off from formula [1], so the time is made 20 seconds or less. On the other hand, under the same conditions, if the heating time falls under 0.7 second, the effective hardened layer depth becomes 0.5 mm or less, so the time is made 0.7 second or more.

After the induction hardening, shot peening or other mechanical surface hardening treatment may be performed.

The soft nitridation, high frequency heating, and quenching may be performed a plurality of times.

EXAMPLES

Next, examples of the present invention will be explained. The conditions of the examples are illustrations which are employed for confirming the workability and advantageous effects of the present invention. The present invention is not limited to these illustrations. The present invention can employ various conditions so long as not departing from the gist of the present invention and so long as achieving the object of the present invention.

A steel material having each chemical composition which is shown in Table 1 was heated to 1250° C., then hot forged and allowed to cool to room temperature, then was again heated and was annealed at 850° C. for 1 hour. After that, it was machined to fabricate pieces for a roller pitting fatigue test consisting of a small roller test piece which has a cylindrical part with a diameter of 26 mm and a width of 28 mm and a large roller test piece with a diameter of 130 mm and a width of 18 mm. Furthermore, a diameter 26 mm, length 100 mm hardness and residual stress measurement test piece was fabricated.

TABLE 1

| Example | Class | \multicolumn{12}{c}{Chemical composition} |
|---|---|---|---|---|---|---|---|---|---|---|---|---|---|
| | | C | Si | Mn | P | S | Cr | Al | N | O | Nb | TI | V |
| 1 | Inv. ex. | 0.55 | 0.25 | 1.00 | 0.013 | 0.020 | 0.13 | 0.010 | 0.0051 | 0.004 | | | |
| 2 | Inv. ex. | 0.57 | 2.21 | 0.38 | 0.010 | 0.015 | 0.05 | 0.031 | 0.0062 | 0.001 | | | |
| 3 | Inv. ex. | 0.75 | 0.20 | 0.40 | 0.019 | 0.002 | 0.03 | 0.050 | 0.0055 | 0.001 | | | |
| 4 | Inv. ex. | 0.33 | 0.26 | 0.51 | 0.012 | 0.005 | 2.51 | 0.033 | 0.0052 | 0.002 | | | |
| 5 | Inv. ex. | 0.52 | 0.05 | 1.95 | 0.011 | 0.007 | 0.20 | 0.032 | 0.0032 | 0.001 | | | |
| 6 | Inv. ex. | 0.50 | 0.51 | 0.75 | 0.009 | 0.021 | 0.15 | 0.035 | 0.0195 | 0.001 | 0.032 | | |
| 7 | Inv. ex. | 0.57 | 0.23 | 0.82 | 0.012 | 0.024 | 0.71 | 0.003 | 0.0047 | 0.001 | | 0.035 | |
| 8 | Inv. ex. | 0.53 | 0.24 | 0.81 | 0.020 | 0.004 | 0.23 | 1.490 | 0.0049 | 0.001 | | | 0.05 |
| 9 | Inv. ex. | 0.54 | 0.75 | 0.70 | 0.016 | 0.001 | 0.15 | 0.025 | 0.0046 | 0.002 | | | |
| 10 | Inv. ex. | 0.56 | 0.26 | 0.75 | 0.013 | 0.002 | 0.56 | 0.030 | 0.0051 | 0.001 | | | |
| 11 | Inv. ex. | 0.54 | 0.24 | 0.73 | 0.005 | 0.013 | 1.21 | 0.035 | 0.0045 | 0.001 | | | |
| 12 | Inv. ex. | 0.55 | 0.25 | 0.76 | 0.023 | 0.014 | 0.11 | 0.034 | 0.0052 | 0.001 | | | |
| 13 | Inv. ex. | 0.56 | 0.23 | 0.82 | 0.016 | 0.017 | 0.21 | 0.032 | 0.0058 | 0.001 | | | |
| 14 | Inv. ex. | 0.53 | 0.26 | 0.76 | 0.015 | 0.015 | 0.15 | 0.033 | 0.0056 | 0.001 | | | |
| 15 | Inv. ex. | 0.52 | 0.23 | 0.80 | 0.011 | 0.009 | 0.18 | 0.032 | 0.0055 | 0.001 | | | |
| 16 | Inv. ex. | 0.55 | 0.22 | 0.86 | 0.022 | 0.001 | 0.20 | 0.035 | 0.0054 | 0.001 | | | |
| 17 | Inv. ex. | 0.56 | 0.25 | 0.86 | 0.019 | 0.003 | 0.14 | 0.036 | 0.0051 | 0.001 | | | |
| 18 | Inv. ex. | 0.57 | 0.26 | 0.78 | 0.013 | 0.015 | 0.16 | 0.032 | 0.0053 | 0.001 | | | |
| 19 | Inv. ex. | 0.53 | 0.20 | 0.77 | 0.014 | 0.002 | 0.13 | 0.030 | 0.0050 | 0.001 | | | |
| 20 | Inv. ex. | 0.54 | 0.24 | 0.81 | 0.012 | 0.012 | 0.15 | 0.035 | 0.0055 | 0.001 | | | |
| 21 | Inv. ex. | 0.55 | 0.23 | 0.79 | 0.009 | 0.013 | 1.15 | 0.031 | 0.0057 | 0.001 | 0.121 | | |
| 22 | Inv. ex. | 0.55 | 0.26 | 0.80 | 0.024 | 0.016 | 0.13 | 0.033 | 0.0053 | 0.001 | | | 0.11 |
| 23 | Inv. ex. | 0.54 | 0.24 | 0.82 | 0.014 | 0.014 | 0.15 | 0.033 | 0.0046 | 0.001 | 0.103 | | |
| 24 | Inv. ex. | 0.53 | 0.25 | 0.83 | 0.013 | 0.018 | 0.16 | 0.035 | 0.0052 | 0.001 | | | |
| 25 | Inv. ex. | 0.42 | 0.26 | 0.81 | 0.017 | 0.016 | 0.12 | 0.032 | 0.0047 | 0.001 | | | 0.51 |
| 26 | Comp. ex. | 0.55 | 0.25 | 1.00 | 0.013 | 0.020 | 0.13 | 0.010 | 0.0051 | 0.004 | | | |
| 27 | Comp. ex. | 0.33 | 0.26 | 0.51 | 0.012 | 0.005 | 2.51 | 0.033 | 0.0052 | 0.002 | | | |
| 28 | Comp. ex. | 0.55 | 0.25 | 1.00 | 0.013 | 0.020 | 0.13 | 0.010 | 0.0051 | 0.004 | | | |
| 29 | Comp. ex. | 0.75 | 0.20 | 0.40 | 0.019 | 0.002 | 0.03 | 0.050 | 0.0055 | 0.001 | | | |
| 30 | Comp. ex. | 0.52 | 0.05 | 1.95 | 0.011 | 0.007 | 0.20 | 0.032 | 0.0032 | 0.001 | | | |
| 31 | Comp. ex. | 0.52 | 0.05 | 1.95 | 0.011 | 0.007 | 0.20 | 0.032 | 0.0032 | 0.001 | | | |
| 32 | Comp. ex. | 0.21 | 0.23 | 0.72 | 0.011 | 0.012 | 0.85 | 0.027 | 0.0052 | 0.002 | | | |
| 33 | Comp. ex. | 0.75 | 0.20 | 0.40 | 0.019 | 0.002 | 0.03 | 0.050 | 0.0055 | 0.001 | | | |

| Example | \multicolumn{12}{c}{Chemical composition} |
|---|---|---|---|---|---|---|---|---|---|---|---|---|
| | Ni | Cu | Co | Mo | W | B | Ca | Mg | Zr | Te | Pb | REM |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| 9 | 1.01 | | | | | | | | | | | |
| 10 | | 0.30 | | | | | | | | | | |
| 11 | | | 0.05 | | | | | | | | | |
| 12 | | | | 0.16 | | | | | | | | |
| 13 | | | | | 0.10 | | | | | | | |
| 14 | | | | | | 0.0020 | | | | | | |
| 15 | | | | | | | 0.0025 | | | | | |
| 16 | | | | | | | | 0.0014 | | | | |
| 17 | | | | | | | | | 0.0016 | | | |
| 18 | | | | | | | | | | 0.0650 | | |
| 19 | | | | | | | | | | | 0.11 | |
| 20 | | | | | | | | | | | | 0.0010 |
| 21 | | | | | | 0.0030 | | | | | | |
| 22 | | | | 0.05 | | | | | | | | |
| 23 | | | | | | | 0.0007 | | | | | |
| 24 | 0.75 | | | | | | | 0.0006 | | | | |
| 25 | 0.51 | | | | | | | | | 0.0006 | | |
| 26 | | | | | | | | | | | | |
| 27 | | | | | | | | | | | | |
| 28 | | | | | | | | | | | | |
| 29 | | | | | | | | | | | | |
| 30 | | | | | | | | | | | | |

TABLE 1-continued 31
32
33

The small rollers and large rollers were, except for Examples 30 and 31, treated by soft nitridation treatment and induction hardening. The soft nitridation treatment consisted of holding the rollers in a soft nitridation atmosphere at 600° C. for a predetermined time, then cooling them by $N_2$ gas. The composition of the gas which was used for the soft nitridation treatment was $N_2(0.45\ Nm^3/h)+NH_3$ $(0.5\ Nm^3/h)+CO_2(0.05\ Nm^3/h)$, while the soft nitridation time was 2 hours in Examples 1 to 25, 28, 29, and 32 to 34, 0.5 hour in Example 26, and 5 hours in Example 27. After the soft nitridation treatment, induction hardening was performed under the conditions which are shown in Table 2. For the coolant at the time of induction hardening, tapwater or a polymer quenching agent was used. After that, the rollers were tempered at 150° C. for 60 minutes and used for fatigue tests.

In Example 30, soft nitridation treatment was not performed. Only induction hardening was performed. Further, in Example 31, only soft nitridation treatment was performed under the above conditions (soft nitridation time: 2 hours). Induction hardening was not performed.

The fabricated large rollers and small rollers were used for a standard bearing fatigue test of a roller pitting fatigue test. In the roller pitting fatigue test, a large roller was pushed against a small roller by a bearing pressure of a Hertzian stress of 3500 MPa, the peripheral speed directions at the contact parts were made the same directions, and the slip rate was made −40% (peripheral speed of contact parts 40% larger at large roller than small roller) for rotation. The temperature of the gear oil which was supplied to the contact part was made 80° C. The lifetime was made the number of rotations of the small roller until pitting occurred at the small roller. The occurrence of pitting was detected by making the two rollers stop rotation when a vibration meter attached to the tester detected vibration and visually confirming the existence of pitting. Further, the cutoff point in the test was made 10,000,000 cycles ($10^7$ cycles).

The residual stress measurement test pieces were subjected to soft nitridation treatment and induction hardening and tempering under the same conditions for the small rollers and large rollers. The N concentration was measured using the above method. The material was electrolytically polished down to 0.01 mm depth, then X-rays were used to measure the residual stress at the 0.01 mm depth. Further, the residual stress measurement test pieces were used for tempering treatment at 300° C. for 60 minutes, were cut to obtain cross-sections, then were measured for hardness profiles from the surfaces to the core parts by a wicker's hardness meter at 0.1 mm pitch.

As shown in Table 2, Examples 1 to 25 all had lifetimes in the roller pitting fatigue test of 10,000,000 cycles ($10^7$ cycles) or more and gave good results of having excellent bearing fatigue strength (high fatigue test lifetime).

For example, Example 1 had a dissolved N concentration of the surface layer of 0.20% and a compressive residual stress in the vicinity of the surface of 433 MPa, so was excellent in the tempered hardness of the surface layer at 300° C. and exhibited a high compressive residual stress in the vicinity of the surface, therefore in a roller pitting fatigue test, the lifetime was 10,000,000 cycles or more and a good bearing fatigue strength was obtained.

TABLE 2

| Example | Class | Soft nitridation Total N concentration from surface to 0.2 mm position (%) | High frequency heating conditions | | | After induction hardening | | | | | |
|---|---|---|---|---|---|---|---|---|---|---|---|
| | | | | | | Surface to 0.2 mm position | | | Effective | | |
| | | | Frequency (kHz) | Temperature (° C.) | Time (s) | Dissolved N concentration (%) | Residual stress (MPa) | 300° C. tempered hardness (Hv) | hardened layer depth (mm) | t/r | Fatigue test life (cycles) |
| 1 | Inv. ex. | 0.21 | 150 | 960 | 2.5 | 0.20 | −433 | 1.50 | 0.12 | 627 | 10,000,000 cycle durability |
| 2 | Inv. ex. | 1.20 | 150 | 950 | 15.0 | 1.18 | −528 | 4.42 | 0.34 | 850 | 10,000,000 cycle durability |
| 3 | Inv. ex. | 0.09 | 150 | 960 | 1.5 | 0.06 | −465 | 0.81 | 0.06 | 606 | 10,000,000 cycle durability |
| 4 | Inv. ex. | 1.12 | 150 | 1050 | 5.1 | 0.68 | −452 | 3.82 | 0.29 | 722 | 10,000,000 cycle durability |
| 5 | Inv. ex. | 0.31 | 100 | 970 | 2.5 | 0.29 | −436 | 1.79 | 0.14 | 645 | 10,000,000 cycle durability |
| 6 | Inv. ex. | 0.24 | 150 | 970 | 2.4 | 0.22 | −434 | 1.42 | 0.11 | 626 | 10,000,000 cycle durability |
| 7 | Inv. ex. | 0.23 | 150 | 970 | 2.5 | 0.21 | −435 | 1.51 | 0.12 | 630 | 10,000,000 cycle durability |
| 8 | Inv. ex. | 0.92 | 150 | 970 | 2.1 | 0.14 | −430 | 1.29 | 0.10 | 640 | 10,000,000 cycle durability |
| 9 | Inv. ex. | 0.22 | 150 | 970 | 2.3 | 0.21 | −431 | 1.56 | 0.12 | 627 | 10,000,000 cycle durability |
| 10 | Inv. ex. | 0.18 | 100 | 970 | 1.9 | 0.16 | −435 | 1.31 | 0.10 | 618 | 10,000,000 cycle durability |
| 11 | Inv. ex. | 0.25 | 150 | 970 | 0.5 | 0.22 | −510 | 0.55 | 0.04 | 630 | 10,000,000 cycle durability |
| 12 | Inv. ex. | 0.15 | 150 | 970 | 2.7 | 0.13 | −427 | 1.41 | 0.11 | 610 | 10,000,000 cycle durability |
| 13 | Inv. ex. | 0.29 | 150 | 970 | 2.4 | 0.27 | −444 | 1.45 | 0.11 | 643 | 10,000,000 cycle durability |
| 14 | Inv. ex. | 0.14 | 150 | 970 | 2.6 | 0.12 | −419 | 1.60 | 0.12 | 607 | 10,000,000 cycle durability |
| 15 | Inv. ex. | 0.11 | 150 | 970 | 1.8 | 0.09 | −417 | 1.52 | 0.12 | 600 | 10,000,000 cycle durability |
| 16 | Inv. ex. | 0.19 | 150 | 970 | 2.3 | 0.17 | −433 | 1.38 | 0.11 | 619 | 10,000,000 cycle durability |
| 17 | Inv. ex. | 0.17 | 150 | 970 | 2.4 | 0.15 | −430 | 1.42 | 0.11 | 615 | 10,000,000 cycle durability |
| 18 | Inv. ex. | 0.15 | 150 | 970 | 2.5 | 0.13 | −425 | 1.53 | 0.12 | 611 | 10,000,000 cycle durability |
| 19 | Inv. ex. | 0.11 | 150 | 970 | 2.3 | 0.09 | −420 | 1.45 | 0.11 | 600 | 10,000,000 cycle durability |
| 20 | Inv. ex. | 0.13 | 150 | 970 | 2.3 | 0.11 | −421 | 1.52 | 0.12 | 605 | 10,000,000 cycle durability |
| 21 | Inv. ex. | 0.30 | 150 | 970 | 2.3 | 0.20 | −436 | 1.40 | 0.11 | 626 | 10,000,000 cycle durability |

TABLE 2-continued

| | | Soft nitridation | High frequency heating conditions | | | After induction hardening | | | | | |
|---|---|---|---|---|---|---|---|---|---|---|---|
| | | Total N | | | | Surface to 0.2 mm position | | | Effective | | |
| Example | Class | concentration from surface to 0.2 mm position (%) | Fre- quency (kHz) | Tem- pera- ture (° C.) | Time (s) | Dissolved N concen- tration (%) | Residual stress (MPa) | 300° C. tempered hardness (Hv) | hardened layer depth (mm) | t/r | Fatigue test life (cycles) |
| 22 | Inv. ex. | 0.18 | 150 | 970 | 2.4 | 0.13 | −426 | 1.45 | 0.11 | 610 | 10,000,000 cycle durability |
| 23 | Inv. ex. | 0.21 | 150 | 970 | 2.1 | 0.18 | −435 | 1.32 | 0.10 | 620 | 10,000,000 cycle durability |
| 24 | Inv. ex. | 0.15 | 150 | 970 | 2.5 | 0.13 | −421 | 1.56 | 0.12 | 609 | 10,000,000 cycle durability |
| 25 | Inv. ex. | 0.28 | 150 | 970 | 2.0 | 0.12 | −420 | 1.32 | 0.10 | 614 | 10,000,000 cycle durability |
| 26 | Comp. ex. | 0.03 | 150 | 970 | 2.5 | 0.01 | −356 | 1.60 | 0.12 | 552 | 5,100,000 cycle durability |
| 27 | Comp. ex. | 2.11 | 150 | 970 | 3.0 | 1.55 | −50 | 1.81 | 0.14 | 369 | 300,000 cycle durability |
| 28 | Comp. ex. | 0.19 | 40 | 970 | 17.0 | 0.18 | +5 | 8.20 | 0.63 | 622 | 5,500,000 cycle durability |
| 29 | Comp. ex. | 0.11 | 150 | 970 | 0.3 | 0.08 | −620 | 0.28 | 0.02 | 610 | 80,000 cycle durability |
| 30 | Comp. ex. | — | 150 | 970 | 2.3 | 0.00 | −336 | 1.51 | 0.12 | 538 | 2,100,000 cycle durability |
| 31 | Comp. ex. | 0.30 | — | — | — | 0.00 | −10 | 0.05 | 0.00 | 245 | 30,000 cycle durability |
| 32 | Comp. ex. | 0.15 | 150 | 970 | 2.3 | 0.14 | −235 | 1.44 | 0.11 | 370 | 900,000 cycle durability |
| 33 | Comp. ex. | 0.09 | 150 | 940 | 3.2 | 0.03 | −351 | 1.62 | 0.12 | 578 | 8,900,000 cycle durability |

Examples 26 and 27 are examples where the dissolved N concentration of the surface layer after induction hardening is off from the present invention. Example 26 has the same steel material as in Example 1, but the soft nitridation treatment is shorter in time. For this reason, the dissolved N concentration of the surface layer fails to reach 0.05%, the tempered hardness of the surface layer at 300° C. is a low value of less than HV 600, and the lifetime is short. Example 27 has the same steel material as in Example 4, but the soft nitridation treatment is longer in time. For this reason, the dissolved N concentration of the surface layer exceeded 1.5% and residual austenite was present in a large quantity, so the tempered hardness of the surface layer at 300° C. was low and, furthermore, the change in volume at the time of quenching was small, so the compressive residual stress in the vicinity of the surface fell, so the lifetime was short.

Examples 28 and 29 respectively have a t/r after induction hardening and an effective hardened layer depth "t" outside the range of the present invention. In each case, the fatigue test life failed to reach 10 million cycles. Example 28 had a low frequency of high frequency heating and a long heating time. For this reason, while the steel material was the same as Example 1, for the shape of the test piece, the effective hardened layer depth was shallow, the compressive residual stress in the vicinity of the surface fell, and the lifetime was short. Example 29 had a short high frequency heating time. For this reason, while the steel material was the same as Example 1, the effective hardened layer depth was shallow, spalling occurred, and the lifetime was short.

Example 30 is an example where a steel material of the same chemical composition as Example 5 is subjected to only induction hardening. There was almost no dissolved N of the surface layer, the tempered hardness of the surface layer at 300° C. and the compressive residual stress in the vicinity of the surface fell, and the lifetime was short.

Example 31 is an example where a steel material of the same chemical composition as Example 5 is subjected to only soft nitridation treatment and is not subjected to induction hardening. The tempered hardness of the surface layer at 300° C. was low and the lifetime was short.

Example 32 is an example where the concentration of C is lower than the range of the present invention and sufficient hardness could not be obtained after induction hardening. For this reason, the dissolved N concentration of the surface layer and the t/r were in the range of the present invention, but the lifetime was short.

Example 33 is an example where a steel material of the same chemical composition as Example 3 is subjected to heat treatment changed in conditions of induction hardening. The high frequency heating temperature was low and the dissolved N concentration became low, so the tempered hardness of the surface layer at 300° C. was low and the lifetime was short.

REFERENCE SIGNS LIST 1. breakage risk site (fatigue fracture site)
2. thickness (2r)

The invention claimed is:
1. A soft nitrided induction hardened steel part comprising:
  a base material with a chemical composition consisting of, by mass %,
  C: 0.30 to 0.80%,
  Si: 0.02 to 2.5%,
  Mn: 0.35 to 2.0%,
  Al: 0.001 to 2.0%,
  Cr: 0.01 to 3.0%,
  S: 0.040% or less,
  N: 0.0030 to 0.02%,
  O: 0.005% or less
  P: 0.025% or less,
  Nb: 0.3% or less,
  Ti: 0.3% or less,
  V: 1.0% or less,
  Ni: 3.0% or less,
  Cu: 3.0% or less,
  Co: 3.0% or less,
  Mo: 1.0% or less,
  W: 0.5% or less,
  B: 0.005% or less,
  Ca: 0.01% or less,
  Mg: 0.01% or less,
  Zr: 0.05% or less,
  Te: 0.1% or less,
  Pb: 0.5% or less,
  REM: 0.005% or less, and
  a balance of Fe and impurities, wherein
  a concentration of dissolved N from the surface of the steel part to 0.2 mm depth is 0.05 to 1.50%, a Vicker's hardness from the surface to 0.2 mm depth after tempering at 300° C. is HV 600 or more, and an effective hardened layer depth "t" is 0.5 mm or more, a radius of a breakage risk site or half of a thickness is "r" in mm, and t/r≤0.35.

2. The soft nitrided induction hardened steel part according to claim 1, wherein the base material consists of one or more of, by mass %, Nb: 0.005 to 0.3%, Ti: 0.005 to 0.3%, V: 0.01 to 1.0%, Ni: 0.01 to 3.0%, Cu: 0.01 to 3.0%, Co: 0.01 to 3.0%, Mo: 0.01 to 1.0%, W: 0.03 to 0.5%, B: 0.0006 to 0.005%, Ca: 0.0005 to 0.01%, Mg: 0.0005 to 0.01%, Zr: 0.0005 to 0.05%, Te: 0.0005 to 0.1%, Pb: 0.0005 to 0.5% and REM: 0.0005 to 0.005%.

* * * * *